May 21, 1968

M. I. WILLINSKI ET AL 3,383,858

NUCLEAR ROCKET ENGINE

Filed Aug. 9, 1956

INVENTORS.
MARTIN I. WILLINSKI
ERNEST A. LAMONT

BY

Harold J. Downes

ATTORNEY

May 21, 1968 M. I. WILLINSKI ET AL 3,383,858
NUCLEAR ROCKET ENGINE

Filed Aug. 9, 1956

INVENTORS.
MARTIN I. WILLINSKI
ERNEST A. LAMONT
BY
Harold J Downes
ATTORNEY

INVENTORS.
MARTIN I. WILLINSKI
ERNEST A. LAMONT
BY
*Harold J. Downes*
ATTORNEY

*INVENTORS.*
MARTIN I. WILLINSKI
ERNEST A. LAMONT

ATTORNEY

May 21, 1968  M. I. WILLINSKI ET AL  3,383,858
NUCLEAR ROCKET ENGINE
Filed Aug. 9, 1956  7 Sheets-Sheet 7

INVENTORS.
MARTIN I. WILLINSKI
ERNEST A. LAMONT
BY
*Harold J. Downes*
ATTORNEY

3,383,858
NUCLEAR ROCKET ENGINE
Martin I. Willinski, Northridge, and Ernest A. Lamont, Woodland Hills, Calif., assignors to North American Rockwell Corporation, a corporation of Delaware
Filed Aug. 9, 1956, Ser. No. 604,294
12 Claims. (Cl. 60—203)

The present invention is directed to a nuclear rocket engine. More particularly, the invention concerns a rocket engine incorporating a liquid neutron reflector for the nuclear reactor core of the engine in heat exchange relationship with the rocket engine working fluid.

Heretofore, various types of nuclear rocket engines have been proposed. These basically have taken the form of incorporating a proven or a somewhat standard form of a conventional nuclear reactor and attempting to fit it into a rocket engine environment. Thus, rocket engines having large masses of graphite as a moderator and reflector have been proposed as well as reactors shielded and moderated by beryllium or beryllium oxide. As is apparent, each of these proposals are such that a rocket engine of great weight is the result, cutting down the available payload and/or range of a rocket powered missile or aircraft. The nuclear rocket engine power plant of this invention accomplishes its primary purpose of weight reduction, affording increased range and payload, by the use of a predetermined thickness of water as a reactor reflector. Such reflector surrounds the nuclear core and acts to absorb heat by neutron reflection, radiation absorption and heat conduction. The reflector serves to control flux distribution and scatters back into the chain-reacting system neutrons which would otherwise be lost as a result of leakage, thus effecting a saving of fissionable material. The rejection of the generated heat is accomplished by conducting the water in a closed cycle system through a heat exchanger using the rocket engine working fluid as the cooling agent. In addition, the reflector water may further function as a rocket engine nozzle coolant. The heat exchanger, the working fluid distribution manifold, and the reactor inlet-end reflector are packaged as a single unit, thus greatly simplifying the engine plumbing system. The invention also encompasses the use of a novel reactor core construction including a honeycomb of impregnated reactor core plates and means in the form of a secondary-type reactor to bleed-off a portion of the heated products of the working fluid to supply a hot gas source for driving the working fluid feed turbine driven pump.

The overall purpose of a nuclear reactor within a rocket engine combustion chamber is to heat the working fluid to an increased temperature prior to its expansion through a rocket nozzle. Heat is generated in the reactor by the fission of uranium-235, plutonium-239 or other fissionable material, by neutrons thermalized, or slowed down, by a graphite moderator. A full and complete discussion of the theory of this fission process in a graphite moderator may be seen in U.S. Patent No. 2,708,656 entitled, "Neutronic Reactor," by E. Fermi et al. Further reference may be had to the publications "The Reactor Handbook" USAEC, vols. 1, 2 and 3, "The Proceedings of the Conference on the Peaceful Uses of Atomic Energy," McGraw-Hill, and "Principles of Nuclear Reactor Engineering," by Glasstone, 1955, with respect to the functioning of a graphite moderated nuclear reactor, to methods of reactor control, and to methods of making reactor-grade graphite. Specifically, reference may be had to "The Control of Nuclear Reactors and Power Plants" by Schutz for the control aspects. The reactor of this invention uses uranium-235 impregnated in the graphite as the reactor core material. Such material may be raised to temperatures of the order of 5,000° F. and still maintain good short-time strength. Due to the impregnation of the plates the reactor can be defined as being of the broad homogeneous type except for the non-impregnated graphite structural supports. The impregnation of the uranium-235 into the graphite may be accomplished by the process fully described in the U.S. patent application by Gordon N. Steele, Ser. No. 557,636, filed Jan. 6, 1956, now Patent No. 2,939,803 or James J. Shyne, Ser. No. 417,099, filed Mar. 18, 1954, now Patent No. 2,969,294. As is apparent from the accompanying drawings a reactor core length-to-diameter ratio close to unity is described in order to reduce the critical mass by decreasing neutron leakage. In a typical size of nuclear rocket engine using approximately two inches of light water at 300° F. as the surrounding reflector and a 30% void homogeneous graphite-uranium fully enriched in U-235 system with uniform fuel distribution, the resultant critical mass is about 85 pounds of the fully enriched uranium. This necessitates an average uranium impregnation density of approximately 0.1 gram per cc. of graphite. This yielded an average carbon-to-uranium atom ratio of approximately 360. Approximately 10% of the fissions are due to thermal neutrons, the median fission energy being approximately 20 ev. This median energy is defined as the energy at which half the fissions take place at higher energies and half at lower energies. The average fission cross section of the uranium-235 is estimated to be 31 barns for the energy range at which fission occurs. Using this cross section the neutron flux is estimated to be $2 \times 10^{16}$ neutrons/(sq. cm.)(sec).

The necessity of minimizing the reactor size for the given power output by maintaining all of the fuel elements at the maximum allowable temperature does not allow the utilization of a uniform distribution of fuel. A non-uniform fuel distribution is generally required in both the radial and axial directions. With respect to radial distribution, the fuel must be less concentrated at the core axis, gradually becoming more concentrated near the outer radius and reaching maximum concentration near the core reflector interface. The axial power distribution is distored from the normal cosine distribution since the large temperature rise of the working fluid passing through the reactor requires that more power be extracted from the fuel plates near the reactor inlet. The entrance effects and the variation of the gas properties with temperature cause the film heat transfer coefficient to be nonuniform, varying in such a way as to require a normal chopped cosine power distribution for a first predetermined length and a decaying exponential distribution for the rearward portion of the core length. A fuel loading giving an increase in critical mass of 50 to 100% will ordinarily be sufficient to obtain this required power distribution. The maximum fuel concentration in the graphite is approximately 0.4 gram per cc. Critical mass savings can be brought about with relatively small reactor weight increases by increasing the core diameter slightly and including some hydrogen or beryllium moderation. Such hydrogen moderation can be accomplished by providing a suitable metal hydride in an ammonia flow passage which will, dissociating under heat, form hydrogen.

An object of this invention is to provide a novel nuclear rocket engine.

A further object of this invention is to provide a nuclear rocket engine having a water reflected nuclear core.

A still further object of this invention is to provide a water reflected nuclear core in combination with a rocket engine working fluid heat exchanger.

An additional object of this invention is to provide a combination nuclear core reflector and rocket engine nozzle coolant system.

A further object of this invention is to provide a novel nuclear reactor core plate and stacking construction.

A still further object of this invention is to provide means within a nuclear reactor core by heating and bleeding off a portion of a rocket engine working fluid to drive a pumping means for such working fluid.

An additional object of this invention is to provide a flowing reflector for the neutron emission of a nuclear reactor core.

A still further object of this invention is to provide a heat exchanger serving to reject heat from a neutron reflector during the functioning of such reflector.

Another object of this invention is to provide a novel insulation means for a high temperature reactor.

The above objects as well as other objects of this invention will be apparent from the following description and drawings in which.

Figure 1:
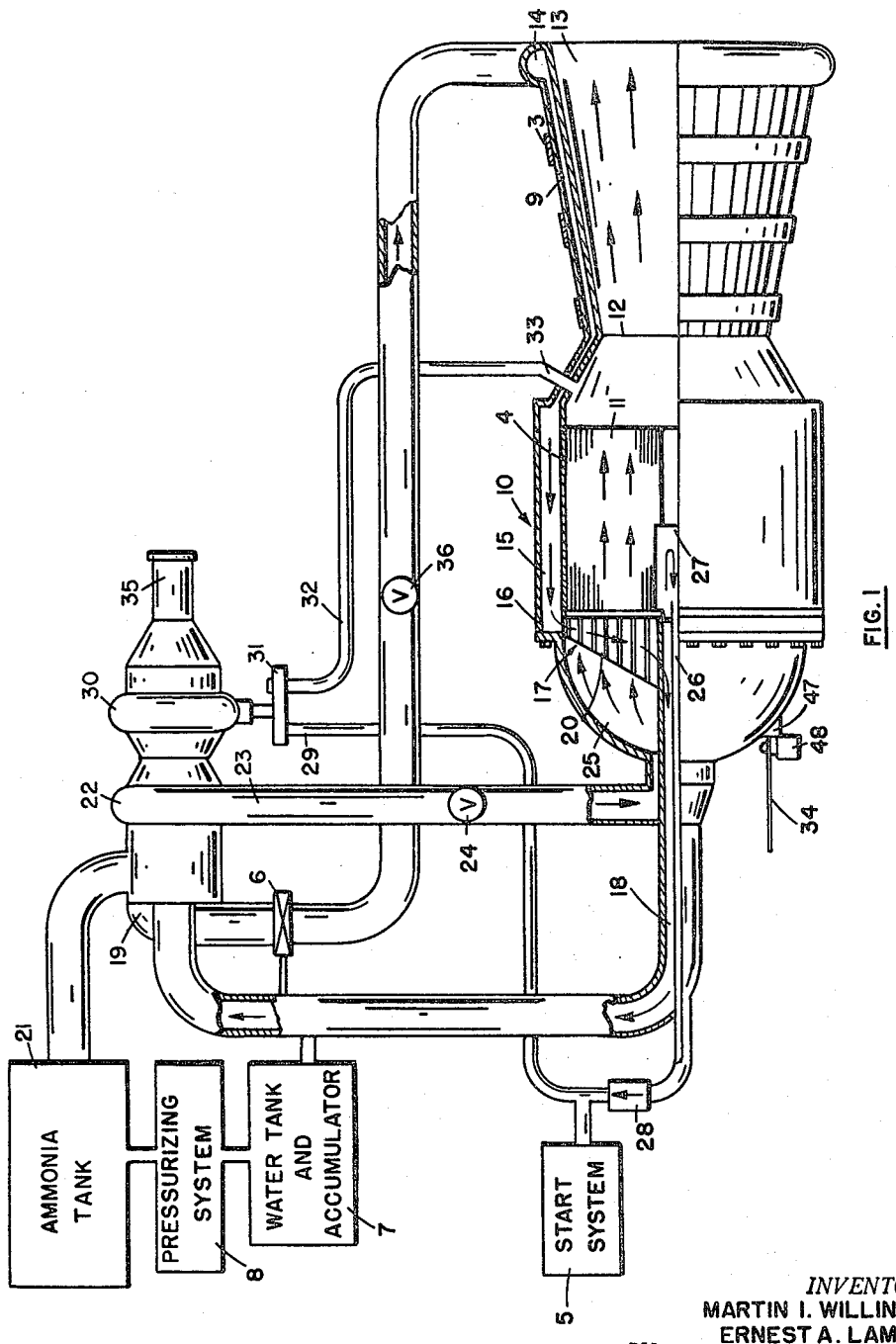
FIG. 1 is an overall schematic diagram of the nuclear rocket engine system.

The nuclear rocket engine of this invention as in all rocket engines has a nozzle section 13 and a throat section 12. Unlike the conventional type rocket engine, the space normally functioning as the combustion chamber is herein filled with a nuclear reactor core. This core 11 extends from adjacent the inlet-end of rocket engine 10 to a position approaching the throat section 12. Surrounding the reactor core is a shell structure through which water is adapted to flow. It has been found that an outer Fiberglas pressure shell may be used during the normal short firing durations of a rocket engine. An insulated layer 4 hereinafter explained, is provided interiorly of the structure forming the water reflector conducting passage 15. This water reflector passage may take the form of a single or multiple row of aluminum tubes of various diameter encircling the insulated layer 4 and extending the length of the reactor. Care must be taken in choosing the tube wall thickness due to the effect of such material nuclearwise on the reactor. These tubes or other passageways are connected to tubes 9 forming the wall of the rocket engine nozzle section 13. Annular tension bands 3 may be incorporated on the nozzle section for holding the tubes in place. Means is provided to flow water both through the double wall of the nozzle section, and through the double wall or tubes of the reactor core section. Water or heavy water, the latter needed in greater amounts if used, from the water pump 19 flows through a coolant pressure regulator 6, a valve 36 and coolant conduit 14 through the nozzle cooling tubes 9 and the peripheral annular reflector passageway 15. The liquid passing through reflector passageway 15 is conducted through a turning manifold 16 after which it proceeds in cross current flow through a heat exchanger unit 17. The liquid reflector-coolant flows out of the engine through return tube 18 back to pump 19. The reflector-coolant liquid thus acts to cool the rocket engine nozzle section, to cool the peripheral sections of the reactor core sections and to scatter reactor core neutron emission both peripherally and forwardly in the direction of the heat exchanger 17. As hereinafter described, when the reactor is critical, flow of the rocket engine working fluid is commenced to the reactor core section. The function of this working fluid is herein explained in terms of liquid ammonia. Other working fluids include lithium hydride, as a powder, a slurry of lithium hydride and a JP fuel, an example of the latter typically being a gasoline type hydrocarbon having about 20% aromatics, methane, a JP fuel alone and hydrogen. When ammonia is used as the rocket engine working fluid, the moderating effect of the hydrocarbon component thereof which would tend to make the reactor overcritical, will be somewhat counteracted by the poisoning effect of the nitrogen component, which for thermal neutrons has a cross section of 1.78 barns. In the launching of a missile powered by the engine of this invention the ammonia flow must be increased gradually with proper compensating action by the control rods since the counteracting effects will not perfectly balance. As the ammonia flow increases, the power level of the reactor rises to a takeoff value, say 2700 mw., at which time the radiation flux level at 50 feet from the reactor is slightly greater than $3 \times 10^{12}$ gammas/cm.$^2$ sec. and $5 \times 10^{12}$ fast neutrons/cm.$^2$ sec. It can thus be seen that a radiation hazard exists and the immediate area of missile launching must be evacuated of personnel or they must be protected by radiation shielding.

A tank 21 is provided to store ammonia which is adapted for flow and pumping through a turbine pump 22, outlet feed line 23, and feed line valve 24 into a working fluid manifold 25. The ammonia then flows through tubes 20 of heat exchanger 17 in cross-current flow to the coolant-reflector liquid passing exteriorly of the tubes. A major portion of the ammonia passes directly through passageways hereinafter described in the reactor core 11. A minor portion passes through a bleed-off 26, comprising a minor nuclear core 27, and passes through valve 28 and turbine feed line 29 to provide a feed for turbine generator 30 which is adapted to rotate the turbine pump 22. Exhaust from the turbine 30 may be passed to waste from the exhaust portion 35 and may provide additional thrust to augment the overall thrust of the rocket engine or may be recondensed and returned to the ammonia feed if the heated products have not been decomposed. The resultant heated products proceed lengthwise down through the reactor core after which they are expanded through the throat portion 12 and emitted from the rocket engine nozzle to provide the driving thrust for the vehicle to which the rocket engine is attached. Control of the nuclear reactor is obtained by manipulation of boron, hafnium, boron steel or other nuclear control rods 34 as is known in the nuclear reactor field. A control rod actuator 48 is provided for moving the control rods 34 into and out of the core portion 11. Control may also be provided by manipulating the pressure of the water such that as the water temperature increases the specific gravity goes down thus tending to make the reactor subcritical. As the decomposition products of the working fluid build up, a pressure sensor 33 provides a pneumatic signal typically through valve controller line 32 to control the turbine feed control valve 31 through which the bleed-off turbine gases pass. A start system 5 generally comprising an auxiliary gas generator or steam boiler is provided to give the initial start to the turbine pump drive 30. A water tank and accumulator 7 and pressurizing system 8 is connected to the propellant or working fluid tank 21 to provide a small net positive suction head to the nuclear rocket engine turbine pump 22. The accumulator 7 also acts as an anti-surge device and allows for water expansion and pressure control. The arrows in FIG. 1 clearly show the flow of the reflector-coolant liquid and the working fluid, through the described system.

Figure 2:
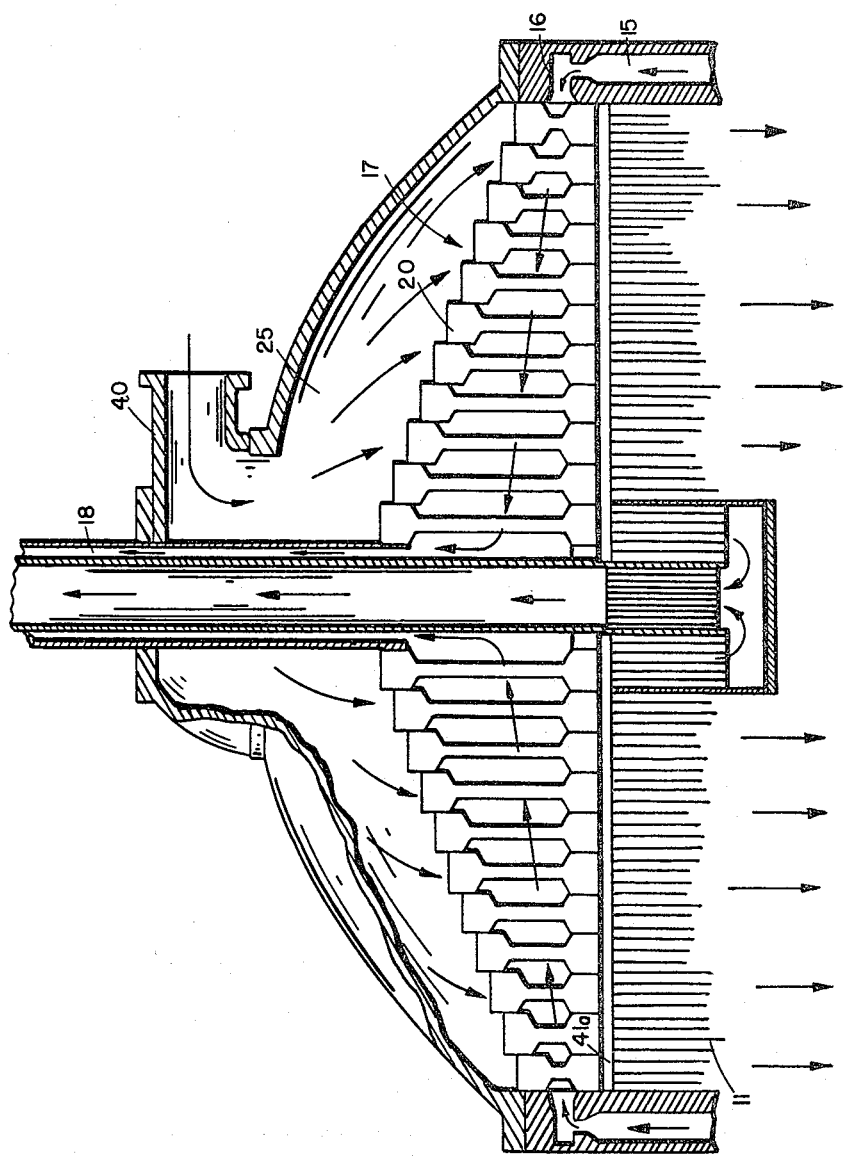
FIG. 2 is a cut away view of the heat exchanger assembly.

FIG. 2 shows in detail the heat exchanger assembly for the nuclear rocket engine of this invention. Working fluid is brought into the rocket engine and this particular assembly through inlet 40 into working fluid manifold 25 and then into the entrance portion of heat exchanger tubes 20. The reflector-coolant liquid passes forwardly through passageways 15 and is turned transversely of the reactor core 11 through turning manifold 16 into cross current flow with the tubes 20. The reflector-coolant then passes out through the return tube 18 to be repumped to the rocket engine nozzle coolant passages. Working fluid after passing through tubes 20 may be distributed into the hereinafter described primary and secondary portions of the nuclear core typically by a distributor plate 41 (FIGURE 3) or through a thermal growth space 41a (FIGURE 2).

Figure 3:
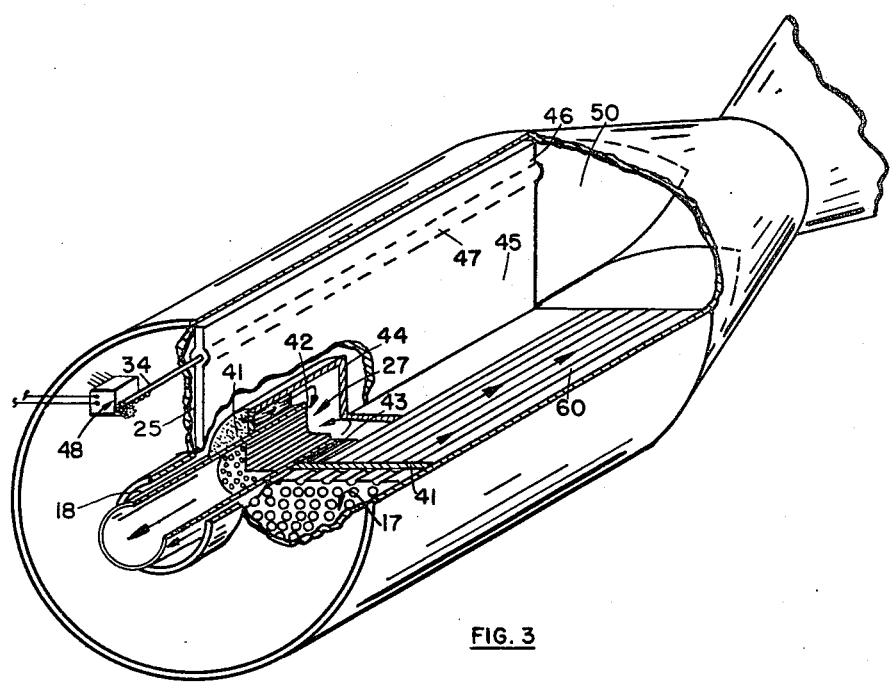
FIG. 3 is a partial cutaway view of the core section of the engine omitting the details of the coolant-reflector loop and the working fluid inlet shown in FIG. 2.

FIGURE 3 is a partial cut away view of the core section of the nuclear rocket engine. In the construction, as shown, a minor nuclear core 27 is provided at the entrance to the main core section. This minor core is coaxial with the center line of the nuclear reactor core and rocket engine shell. The minor core 27 comprises an outer portion 43 through which the working fluid passes through after being introduced through the tubes of heat exchanger 17 and distributor plate 41. The working fluid is heated in this minor core section and is redirected in a 180° direction by a baffle 44 so that it flows back through an inner section 42 to turbine pump 30. The volatilized working fluid gases are further heated in this inner core section 42 to a temperature, in the case of ammonia, compatible with turbine stress design. This provides a bleed-off suitable for driving the aforesaid turbo pump. FIG. 3 also shows in detail a typical construction for seating the hereinafter described core plates 60 within the nuclear reactor core shell. A series of graphite support slabs 45 have indentation ridges 46 into which the core plates 60 are placed. A required number of control rod bores 47 extend longitudinally within the graphite support slabs 45. A control rod 34 is adapted to move longitudinally within a bore 47 so as to control the nuclear reaction in the core. The control rod 34 is actuated by an actuator mechanism 48 as is well known in the nuclear reactor field, such as a rack and pinion drive. Means may also be provided to effectively cool the control rod and actuator mechanism. A typical cooling means may be seen in FIG. 13. In order to provide structural rigidity and strength in the core, a curved extension 50 is provided on the end of the slab 45 to seat against the necked-down portion of the rocket engine approaching the throat section.

Figure 4:
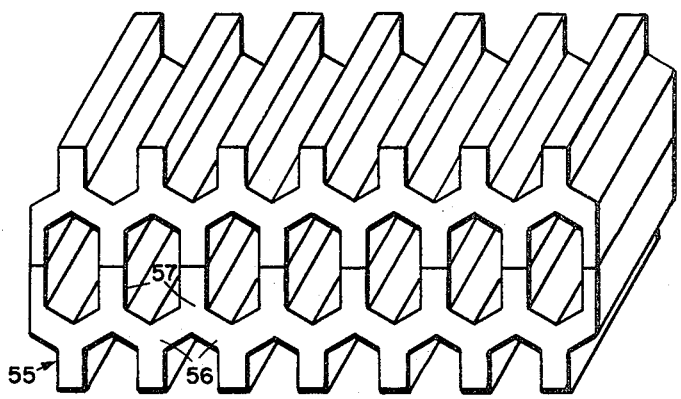
FIG. 4 is a perspective view of preferred reactor core plates.
Figure 5:
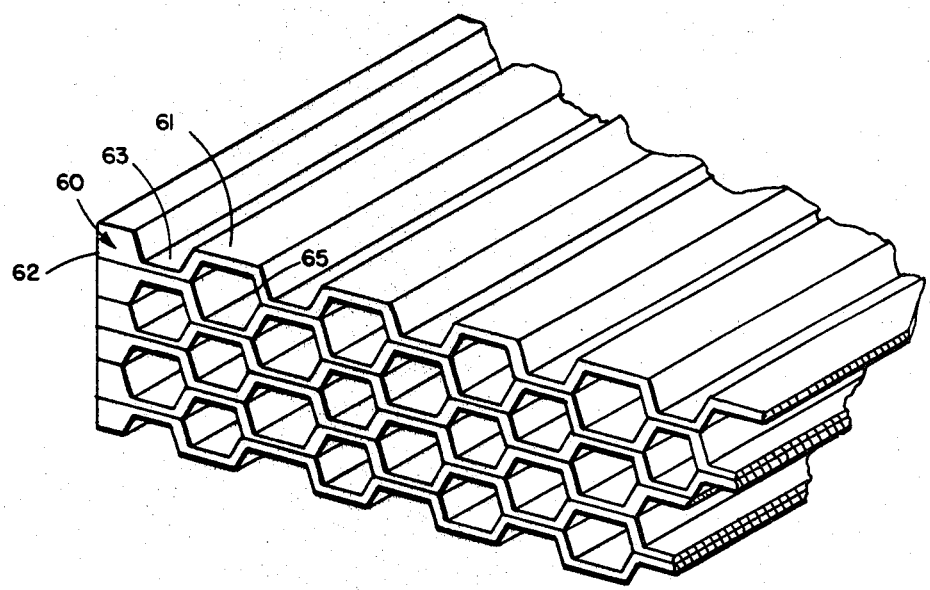
FIG. 5 is a group of stacked core plates.

FIG. 4 shows in detail a portion of a core plate construction 55 which is a preferred form. Each plate is made up of a series of Y and inverted Y sections 56 and '57 having a common leg. This type core is characterized by the resultant passages all with the same wall thickness. As shown in FIG. 5, modified core plates 60 are built up into a cellular structure. The graphite plates may be grooved, machined, cast or formed into a structure having edge portions 61 and 62 and grooves or channels 63 running parallel to such portions. Materials other than graphite, such as a zirconium cased fuel and refractory metal carbides including Ti, W, Ta and Mo can be used for these plates. Each of these plates are impregnated or filled with a fissionable material such as uranium-235, as described in the above set out patent applications, prior to assembly. It is readily seen that the actual shape and size of the grooves as well as the thickness and surface characteristics, due to various manufacturing methods, are factors which will vary in the particular reactor design. The fissionable material may also be plated, painted, coated, etc., on the plates. The nuclear core heat exchanger construction is characterized by the large surface-to-volume ratio therein. As seen in FIG. 5, the stack plates 60 formed a series of honeycomb cells 65 through the assemblage.

Figure 6:
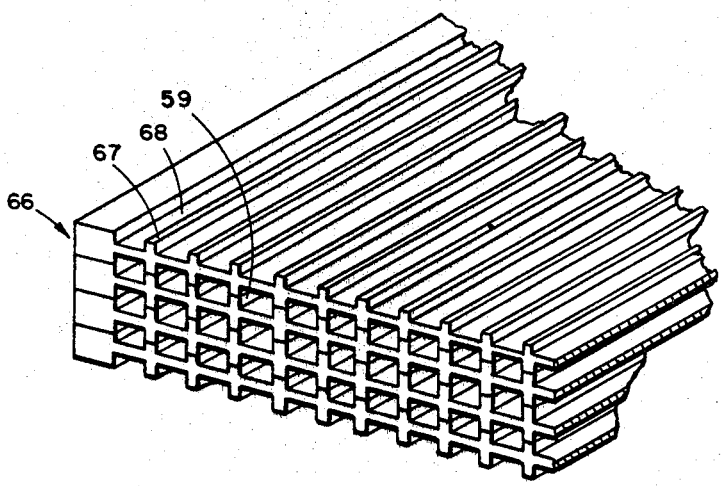
FIG. 6 is a group of modified core plates.

In FIG. 6, plates 66 are stacked on top of each other and ridges 67 formed thereon are placed in juxtaposition so that the channels 68 between the ridges 67 form a series of honeycomb-like cells 59. One of the many advantages of the plates of this invention is that they may be easily plated with a protective layer such as a heavy metal carbide prior to assembly.

Figure 7:
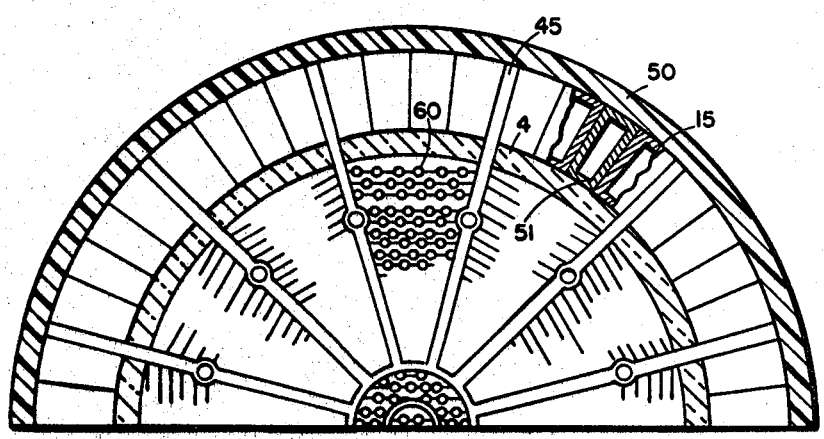
FIG. 7 is a cross sectional view showing the overall reactor core configuration.

It can be seen that several methods can be employed for stacking these plates between the groove support slabs seen in FIG. 3. In FIG. 7 plates 60 are stacked longitudinally between the groove support slabs 45 so as to have a sector-like end cross section. The outer shell 50 of the rocket engine, the peripheral, annular liquid reflector passageway 15, and the inner shell 51 are supported from the core plates 60 by a heat insulation layer 4 which typically may be made of carbon wool and/or graphite. The graphite supporting slabs 45 form a spoked wheel-type of arrangement in cross section. This arrangement provides the maximum support necessary to overcome pressure differential across the reactor heat exchanger or core. The support slabs or beams may be supported by the reactor chamber walls as illustrated in FIG. 3 or may be held in assembled position by tensile rods extending into the reactor dome or intake manifold section 25 shown in FIG. 2.

Figure 8:
FIG. 8 is a cross sectional view of a core supporting member.

FIG. 8 shows an end section of the radial slab portions 45 with the supporting ridge 46. Pressure forces on the stacked reactor plates, due to flow of the working fluid therethrough, are reacted into the ledges 46 of the slab and then directly outwardly to the shell of the nuclear rocket engine. As an alternative arrangement, the control rod housing around bore 47 (FIG. 1) heretofore explained, may itself be a hollow support rod extending through the dome portion of the working fluid manifold 25.

Figure 9:
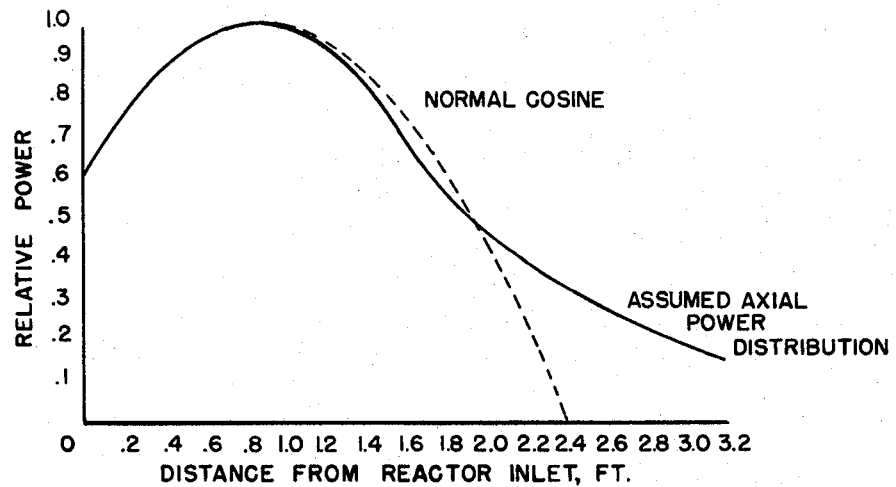
FIG. 9 is a graph showing the reactor axial power distribution.
Figure 10:
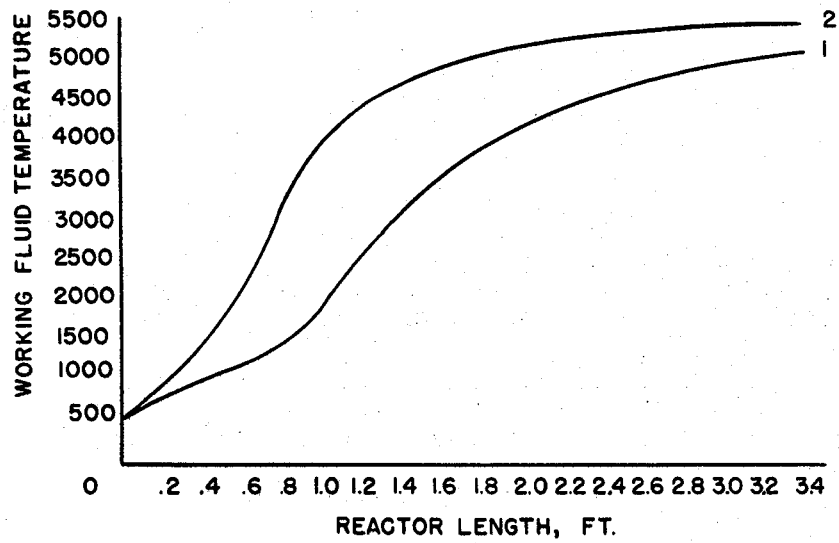
FIG. 10 is a graph showing variations of working fluid static temperature with reactor length.

FIG. 9 is a graph showing a typical reactor axial power distribution curve plotting relative power against the distance in feet from the reactor inlet. FIG. 10 shows the variation of temperature along the length of the reactor for various conditions of operation, for example, curve 1 represents a core passageway of 0.100 inch equivalent diameter $D_e$ of a hexagonal cross section, a core wall thickness X of 0.100 inch, an inlet static pressure P of 1500 p.s.i. and a mass velocity G of ammonia of 340 lbs./sec.-ft.$^2$. Curve 2 is based on a $D_e$ value of 0.075, an X of 0.075, a P of 2000 and a G of 240. It has been found that an increase of several hundred p.s.i. in ammonia inlet pressure increases the maximum obtainable gas temperature by several hundred degrees. This effect of pressure on gas temperature is more pronounced as the hole size is decreased. An increase in only the equivalent diameter of the hole will increase the maximum gas temperature. This effect of hole size on gas temperature is increased slightly with a decrease in wall thickness. A similar effect of equivalent diameter on maximum gas temperature is found with an increase in mass velocity. Increasing only the mass velocity of the working fluid will reduce the maximum obtainable temperature. This effect is most pronounced with a decrease in equivalent diameter of the hole. Increasing only the wall thickness will reduce the maximum gas temperature and increase the reactor length with the same exit gas temperature.

Figure 11:
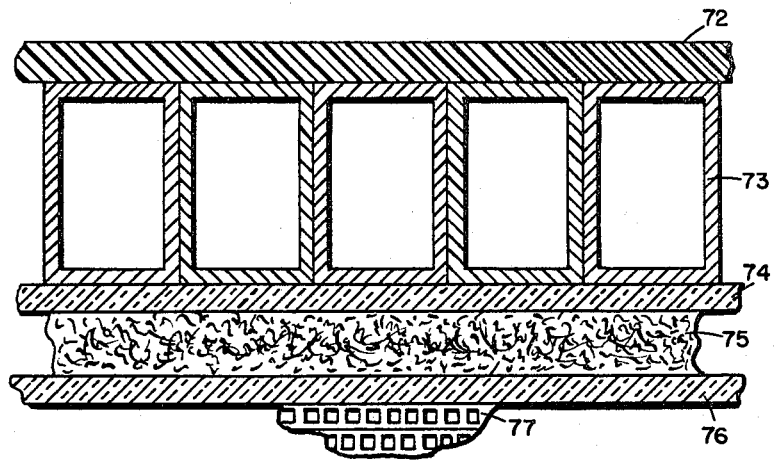
FIG. 11 is a cross sectional view of the rocket engine wall structure.

FIG. 11 shows a cross sectional view of the typical rocket engine wall structure. The outer Fiberglas or other material outer shell is designated 72. This surrounds aluminum tubes 73, a graphite wall 74, carbon wool 75, a second graphite wall 76 and the reactor plates 77 abutting thereagainst.

Figure 12:
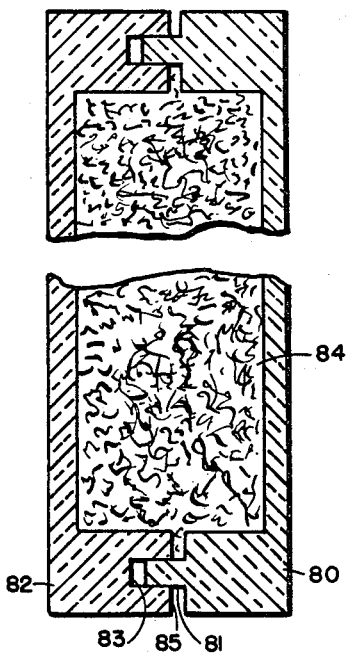
FIG. 12 is a cross sectional view of an insulation layer for the engine.

FIG. 12 shows a cross sectional view of an insulation means for the engine. The nuclear core is surrounded by a series of circumferentially curved boxes made of graphite and containing carbon wool 84. The boxes have a locking rim 81 containing outer half 80 abutting the coolant-reflector tubes. An inner half 82 having a locking groove 83 abuts the reactor core plates. In operation sufficient gap 85 is left between the locking members so that thermal growth of the core compresses the insulator by a sliding or expandable action without transmitting the forces to the tubes or external skin. The above described insulation may be made in any desired shape to adapt it for other high temperature masses.

Figure 13:
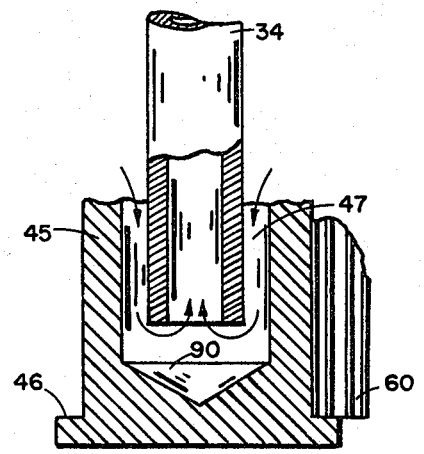
FIG. 13 is a cross sectional view of the inner end of a cooled control rod.

A partial cross sectional view of a cooled control rod is seen in FIG. 13. The heretofore described graphite beam 45 has a control rod housing bore 47 through which control rod 34 passes. In the "in" position, rod 34 extends nearly to the aft end 90 of beam 45. Coolant in the form of water, ammonia or third fluid flows aft in the annular space between the bore and the rod and then forwardly through a bore running centrally the entire length of the rod.

TABLE I.—POWER PLANT PERFORMANCE

*Overall performance*

| | |
|---|---|
| Sea level thrust, lb. | 147,000 |
| Sea level specific impulse, sec. | 350 |
| Working fluid | Ammonia |
| Ammonia flow rate at sea level, lb./sec. | 420.3 |
| Reactor reflector—power plant coolant | Water |
| Water flow rate, lb./sec. | 400 |

*Reactor-nozzle assembly*

| | |
|---|---|
| Ammonia reactor inlet pressure, p.s.i.a. | 1500 |
| Ammonia mass velocity, in flow passages lb./(sec.) (sq.ft.) | 300 |
| Ammonia inlet temperature, °F. | 60 |
| Maximum reactor core temperature, °F. | 5000 |
| Interface heat transfer area sq. ft. | 2090 |
| Overall coefficient of heat transfer, based on interface, B.t.u./(hr.) (sq. ft.) (°F.): | |
| Inlet | 940 |
| Outlet | 2610 |
| Logarithmic—mean overall temperature difference, °F. | 1810 |
| Reactor core length, in. | 38.4 |
| Reactor core diameter, in. | 34.8 |
| Throat area, sq. in. | 116.9 |
| Reactor outlet-to-throat area ratio | 8.14 |
| Nozzle expansion area ratio, (cone shape) | 20:1 |
| Reactor power, megawatts | 2690 |
| Specific power, megawatts/cu. ft. or core volume | 127.5 |
| Estimated uranium fully enriched critical mass, uniform fuel distribution, lb. | 85 |
| Reactor core void fraction | 0.326 |
| Median fission energy, ev. | 20 |
| Average uranium impregnation density, gm./cc. | 0.1 |
| Average uranium-to-carbon atom ratio | 360 |
| Maximum uranium impregnation density, gm./cc. | 0.4 |
| Average U-235 fission cross section, barns | 31 |
| Reactor neutron flux, neutrons/(sq. cm.) (sec.) | $2 \times 10^{16}$ |

*Water pump*

| | |
|---|---|
| Water flow rate, lb./sec. | 400 |
| Discharge pressure, p.s.i.a. | 2010 |

*Turbine*

| | |
|---|---|
| Gas [1] temperature at turbine inlet, °F. | 1500 |
| Gas flow rate, lb./sec. | 10.1 |

*Heat exchanger*

| | |
|---|---|
| Total heat exchange rate, B.t.u./hr. | 133,000,000 |
| Heat transfer area, sq. ft. | 74.3 |
| Water inlet temperature, °F. | 360 |
| Water temperature drop, °F. | 92.5 |
| Ammonia inlet temperature, °F. | −28 |
| Ammonia temperature rise, °F. | 88 |
| Water pressure drop, p.s.i. | 300 |
| Ammonia pressure drop, p.s.i. | 37 |

[1] From reactor minor core.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A nuclear rocket engine comprising a thrust chamber including a reactor core having means to conduct a coolant-reflector externally thereof, a nozzle section having coolant passages in a wall thereof, a heat exchanger, a rocket propellant fluid, a liquid coolant-reflector, a closed-loop conduit system adapted to flow said liquid coolant-reflector through said means, said coolant passages and said heat exchanger, means to flow said propellant fluid through said heat exchanger in heat exchanging relation with said liquid coolant-reflector, and means injecting said propellant fluid from said heat exchanger through said reactor core, said propellant fluid being substantially vaporized by heat from said reactor and subsequently being ejected from said nozzle section to provide rocket thrust.

2. The invention as set out in claim 1 further comprising means to bleed off a portion of said propellant fluid as it is heated by said reactor core, and means to flow said propellant fluid and said coolant-reflector to said thrust chamber, said last mentioned flow means being driven by said bleed-off portion.

3. A nuclear rocket engine comprising a thrust chamber having a nuclear reactor core therein, means to conduct a coolant-reflector externally thereof, a rocket working fluid inlet at one end of said chamber adjacent one end of said reactor core, a heat exchanger adjacent said inlet and adapted to exchange heat from said coolant-reflector to a working fluid passed through said inlet, means to pass the working fluid from said heat exchanger through said reactor core, rocket nozzle means at the other end of said chamber and reactor core to rapidly expand gaseous products of said working fluid from said reactor core and a closed loop conduit system adapted to flow said coolant-reflector through said first mentioned means and said heat exchanger.

4. The invention as set out in claim 3 including turbine means to pump the working fluid through said inlet and means to direct a portion of said working fluid through a section of said nuclear reactor core in said one end of said core and to redirect the resultant gaseous products to drive said turbine means.

5. The invention as set out in claim 3 in which the coolant-reflector is water and the working fluid is ammonia.

6. The invention as set out in claim 3 in which said heat exchanger comprises an annular series of spaced, longitudinally extending tubes upstream of said reactor, said tubes being adapted to distribute said working fluid from said inlet to said core, and means to flow said coolant-reflector transversely through said series of tubes to heat said working fluid and to reflect neutrons from said core.

7. The invention as set out in claim 3 in which said reactor core comprises longitudinally extending uranium-impregnated graphite plates having longitudinally extending grooves therein.

8. The invention as set out in claim 7 in which the size, spacing, mass and percentile impregnation of said plates are sufficient to sustain a chain reaction.

9. The invention as set out in claim 7 in which said longitudinally extending plates are radially stacked around the central axis of said thrust chamber.

10. In combination, a rocket engine thrust chamber, a nuclear reactor core within said chamber, a heat exchanger at one end of said core, means to pass a rocket engine working fluid through said heat exchanger to said core, means around the periphery of said core to pass a liquid coolant-reflector exteriorly of said core, means connected to said last mentioned means to conduct said coolant-reflector in cross-flow to said working fluid passing through said heat exchanger and means circulating said coolant-reflector through said means around the core periphery and said heat exchanger.

11. The invention as set out in claim 10 in which the heat exchanger comprising a series of spaced hollow tubes adapted to distribute working fluid to said core through the interior thereof.

12. The invention as set out in claim 10 including expandable heat insulation means between said core and said peripheral passing means.

References Cited

UNITED STATES PATENTS 2,705,399  4/1955  Allen _____ 60—39.66 X
2,728,192  12/1955  Ross _____ 60—39.66 X

FOREIGN PATENTS 1,078,653  5/1954  France.

OTHER REFERENCES

The Science and Engineering of Nuclear Power, vol. II, edited by Clark Goodman, Addison Wesley Press, 1949, pp. 183–185, 188–192, 194, 279–281.

Rocketscience, vol. 3–4 qtly., pp. 88–91, pub. date December 1949, "The Atomic Rocket Motor," pt. III by M. G. Whybra.

Popular Science, October 1951, pp. 98–102.

Rockets and Guided Missiles by John Humphries, Mac-Millan Co., New York, 1956, pp. 194–196.

Nuclear Rocket Propulsion by R. W. Bussard and R. D. DeLauer. McGraw Hill Book Co., New York, 1958, pp. 192, 193, 244–247, 260, 268–272.

REUBEN EPSTEIN, *Primary Examiner.*

ROGER L. CAMPBELL, *Examiner.*

WILLIAM G. WILES, *Assistant Examiner.*

UNITED STATES PATENT OFFICE
CERTIFICATE OF CORRECTION

Patent No. 3,383,858                                    May 21, 1968

Martin I. Willinski et al.

It is certified that error appears in the above identified patent and that said Letters Patent are hereby corrected as shown below:

In the heading to the printed specification, lines 4 and 5, "assignors to North American Rockwell Corporation, a corporation of Delaware" should read -- assignors, by mesne assignments, to the United States of America as represented by the United States Atomic Energy Commission --.

Signed and sealed this 11th day of November 1969.

SEAL)

Attest:

Edward M. Fletcher, Jr.                          WILLIAM E. SCHUYLER, JR.

Attesting Officer                                        Commissioner of Patents